(12) United States Patent
Manroa et al.

(10) Patent No.: US 9,544,837 B2
(45) Date of Patent: Jan. 10, 2017

(54) COMMUNICATION MANAGEMENT AND TARGETED MESSAGE DELIVERY

(71) Applicants: Arun Manroa, Herndon, VA (US); Qiang Zhang, Fairfax, VA (US)

(72) Inventors: Arun Manroa, Herndon, VA (US); Qiang Zhang, Fairfax, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/445,623

(22) Filed: Jul. 29, 2014

(65) Prior Publication Data
US 2016/0037438 A1    Feb. 4, 2016

(51) Int. Cl.
| | |
|---|---|
| H04W 4/00 | (2009.01) |
| H04W 48/16 | (2009.01) |
| H04W 12/06 | (2009.01) |
| H04W 12/08 | (2009.01) |
| G06Q 20/32 | (2012.01) |
| H04W 84/12 | (2009.01) |

(52) U.S. Cl.
CPC ............ *H04W 48/16* (2013.01); *H04W 12/06* (2013.01); *H04W 12/08* (2013.01); *G06Q 20/32* (2013.01); *H04W 84/12* (2013.01)

(58) Field of Classification Search
CPC ...... H04W 48/16; H04W 12/08; H04W 12/06; H04W 84/12; G06Q 20/32
See application file for complete search history.

(56) References Cited

U.S. PATENT DOCUMENTS

| | | | | |
|---|---|---|---|---|
| 2007/0282915 | A1* | 12/2007 | Vosshall | G06F 17/30575 |
| 2008/0244076 | A1* | 10/2008 | Shah | H04W 4/02 709/227 |
| 2008/0255944 | A1* | 10/2008 | Shah | G06Q 30/02 705/14.47 |
| 2009/0093264 | A1* | 4/2009 | Heredia | H04L 12/581 455/466 |

\* cited by examiner

*Primary Examiner* — Clemence Han
(74) *Attorney, Agent, or Firm* — Chapin Intellectual Property Law, LLC

(57) ABSTRACT

A network environment includes a wireless access point providing access to a corresponding network. A server resource initiates verification (such as authorization) of a mobile communication device attempting to establish a secured wireless link between the mobile communication device and a network access point. Based on an outcome of the verification, the server resource produces control information. The server resource forwards the control information to a gateway resource that controls a flow of communications between the network access point and a network. The gateway resource facilitates transmission of one or more messages to the mobile communication device in accordance with the control information.

27 Claims, 10 Drawing Sheets

COMMUNICATION MANAGEMENT AND TARGETED MESSAGE DELIVERY

BACKGROUND

Conventional computer devices typically have the ability to identify a presence of WiFi™ access points. For example, according to current technology, to learn of one or more access points in a region, a computer device can transmit a wireless query signal (e.g., a probe request) in a region. In response to the wireless query signal, any of one or more active WiFi™ network access points in the region will respond with information indicating their identities (a.k.a., SSIDs). In certain instances, a respective SSID is a human-readable network name assigned to a respective network. Accordingly, via the response information from the access points, the operator of the computer can identify which, if any, WiFi™ networks are available for use in the region.

After identifying available WiFi™ networks, the computer device can initiate display of the identities of the different WiFi™ networks on a display screen. In such an instance, the user of the computer can manually select from a listing of the available WiFi™ networks (SSIDs) in which to connect. According to conventional techniques, since each SSID (network name) corresponds to a different available network, the respective user is able to connect to any of multiple networks depending upon the chosen SSID (network name).

If the WiFi™ access point is an open WiFi™ network, the user will not need to provide a password to be granted access to the Internet through the selected WiFi™ access point. Alternatively, in certain instances, such as in secured WiFi™ networks, the user may be required to provide appropriate credentials (such as username, password, etc.) to use the wireless access point.

If used, a downside of open networks is that illegitimate users (a.k.a., hackers) can potentially eavesdrop on respective wireless communications between a computer device and a respective WiFi™ access point. Via eavesdropping, an illegitimate user may be able to learn of a respective network address associated with the computer device. Using the network address, the illegitimate user may be able to control use of the communication link and/or steal personal data. Thus, unsecured wireless communications (such as WiFi™ communications) are typically undesirable.

To alleviate and/or prevent hacking of wireless communications, several wireless communication protocols have been established for use in WiFi™ applications to provide more secured wireless communications. For example, the EAP (Extensible Authentication Protocol) is a desired protocol for use in wireless network applications. The EAP protocol expands on authentication methods used by the Point-to-Point Protocol (PPP), a protocol often used when connecting a computer to the Internet.

In general, to communicate in accordance with a wireless security protocol such as EAP, a user requests to establish a connection with a respective wireless access point (such as via the WiFi™ communication protocol). In response to receiving the request, the wireless access point requests that the user (or corresponding mobile communication device) of the communication device provide identification information. The wireless access point forwards the identification information received from the user to an authentication server. The authentication server challenges the user of the communication device to provide proof of the validity of the provided identification information. The wireless access point receives and forwards authentication information (such as password, etc.) received from the user to the authentication server. Based on received credentials, the authentication server authenticates the user and corresponding mobile communication device.

In addition to determining whether received credentials are correct for the corresponding identity of the communication device, the authentication server can be configured to determine whether the corresponding user is authorized to access a respective network. Authorization can include retrieving status information indicating whether or not the corresponding user of the mobile communication device is up-to-date on paying appropriate subscription fees. Typically, a status of paying the subscription fees determines whether or not the corresponding user of the mobile communication device is going to be allowed access to a respective network such as the Internet.

As a more specific example, after authentication, assume that an authorization server detects that the corresponding user is delinquent in paying their subscription fee. In response to detecting such a condition, the authorization server notifies the wireless access point not to provide the user of the mobile communication device access to the Internet. Conversely, if the authorization server detects that the corresponding user is up-to-date paying their subscription fees, the authorization server will notify the wireless access point to provide the user of the mobile communication device access to the Internet.

BRIEF DESCRIPTION OF EMBODIMENTS

Use of conventional wireless networks suffer from a number of deficiencies. For example, as previously discussed, an access point can be communicatively coupled to a respective network. In certain instances, during an authorization check, a respective user of the communication device may be denied access to a corresponding network such as the Internet because the user did not pay their corresponding subscription bill. In other words, if a respective subscriber does not timely pay appropriate subscription fees, the corresponding user may be denied the ability to establish a corresponding wireless communication link access point.

According to certain conventional techniques, there is no easy way to provide notification to a respective user of authorization errors that occur during the authorization check. For example, in accordance with conventional techniques, when it is determined that the respective user of a mobile communication device is not authorized to use a network, the user is simply denied access without receiving any visual notification of the authorization failure. Without an appropriate notification, the user subscriber may have no idea why they are being denied access.

As a more specific example, for secure EAP-based WiFi™ authentication (802.1x), the current industry practice leaves error handling to the target communication device by sending a reply message (such as a denial of access) in an authentication response through the access point to the requesting mobile communication device. However, most devices receiving the denial reply message do not honor nor display any proper error notification to the corresponding user indicating why access has been denied. This can be frustrating to a user because they are not informed, even though they were properly authenticated, why they are being denied access to a respective network. It may appear to the user that their device is not working properly.

In contrast to conventional techniques, embodiments herein include a network assisted method and/or corresponding computer processor hardware to consistently notify respective mobile device users of different types of messages such as those occurring during authorization. Notification of authorization errors can include providing instructions to the corresponding subscriber on a display screen of a corresponding mobile communication device such that the subscriber (who may be properly authenticated based on provided credentials) can take corrective action to prevent future authorization errors.

More specifically, as an illustrative example, assume that a network environment includes a mobile communication device operated by a corresponding user attempting to access a respective network such as the Internet. To access the network, the mobile communication device first attempts to establish a wireless communication link with and through a corresponding wireless access point. In one embodiment, the mobile communication device attempts to establish a secured wireless link with the access point in accordance with the EAP protocol. Establishing the wireless link can include the mobile communication device forwarding identity information, credentials, etc., to a remote server (such as a AAA or Authentication, Authorization, Accounting server).

Subsequent to authenticating the mobile communication device based on the forwarded information (such as identity information, credentials, etc.), the remote server can be configured to initiate verification (such as authorization) of the mobile communication device and/or corresponding user so that the mobile communication device can establish and/or use a wireless link between the mobile communication device and the network access point to access the network. Verification of the mobile communication device can include detecting whether the mobile communication device is authorized to access the network.

Based on an outcome of the verification (such as authorization) of the mobile communication device and/or corresponding user, the remote server produces control information. In one embodiment, the control information specifies how to control a flow of communications received from the mobile communication device over the wireless communication link to the network such that the mobile communication device and corresponding user are informed of one or more messages. As a more specific example, the remote server can be configured to produce the control information in response to detecting occurrence of an event such as an authorization error associated with providing the mobile communication device network access through the gateway resource. In one embodiment, the control information specifies a particular server resource in the network in which to redirect a communication transmitted by and received from the mobile communication device over the wireless link to the access point.

The remote server forwards the control information to a service provider operated gateway resource (such as a WiFi™ session controller gateway). The gateway resource utilizes the control information to control a flow of communications between the network access point and the network. In accordance with the control information received from the remote server, the gateway resource facilitates conveyance of messages to the mobile communication device. The messages to the mobile communication device can include any useful information.

In accordance with further embodiments, during the verification process, the remote server can be configured to detect an identity of a user operating the mobile communication device. For example, the remote server can be configured to use information such as the detected identity of the user as a basis to define what information is to be included in a message to the user of the communication device. More specifically, assume that the remote server detects an authorization error during a step of determining whether corresponding user of the mobile communication device is authorized to access the network. By way of non-limiting example, the detected authorization error can be of any type such as: i) that the user of the mobile communication device has used more than a predetermined number of granted simultaneous WiFi™ sessions, ii) that the user of the mobile communication device has a suspended account because the user of the mobile communication device has an outstanding unpaid subscription fee due preventing use of an access point to access the network, iii) that the user subscribes to a low tier high speed data service that does not allow WiFi™ access, iv) that the user has exceeded an amount of data retrieval or has exceeded an amount of allocated access time as specified by a WiFi usage plan, etc.

Any of these authorization errors would normally prevent a respective user from accessing a network using a respective wireless access point. However, rather than preventing the mobile communication device access with the network, certain embodiments herein include providing the respective user and/or corresponding mobile communication device at least temporary authorization to use a wireless network and/or access the network such as the Internet via communications conveyed through a wireless access point and a gateway resource even though there is an authorization failure. Thus, despite detection of an authorization error, the remote server can be configured to at least temporarily authorize and allow the mobile communication device to access the network via communications through the gateway resource.

Assume in this example that the remote server performing verification of the user and/or corresponding mobile communication device detects one or more authorization errors. In one embodiment, in response to detecting the one or more authorization errors, the remote server initiates generation of notification information indicating the detected authorization error. The remote server (or other suitable resource generating the notification information) can be configured to incorporate the notification information in a retrievable resource such as a webpage. The remote server forwards or makes the notification information available the webpage from a particular server resource in the network.

Subsequent to receiving the control information and establishing of the wireless communication link between the mobile communication device and the access point, assume that the gateway resource receives a communication transmitted from the mobile communication device to retrieve data from the network. For example, assume that the user operating the mobile communication device opens a browser application and generates a request to access content from a specified website. Normally, the mobile communication device would transmit the request for content over the wireless communication link to the access point that, in turn, forwards the request through the gateway resource over a network such as the Internet to the target destinations such as Google.com to retrieve requested content. However, in this example, assume that an event such as an authorization error occurred while the corresponding mobile communication device was attempting to communicate through the access point to the network. To provide notification of the authorization error in accordance with the received control information, in response to receiving the communication (request for content) generated by the mobile communication device, the gateway resource initiates transmission of a corresponding message (including the notification information of the authorization error) to the mobile communication device for display to the corresponding user.

In accordance with the control information received from the server resource, the gateway resource can initiate transmission of a corresponding message to the mobile communication device in any suitable manner.

For example, in one embodiment, the gateway resource intercepts the message transmitted (such as transmitted to Google.com) by the mobile communication device through the wireless access point. In accordance with received control information, instead of transmitting the communication generated by the mobile communication device to the original intended recipient (such as Google.com), the gateway resource redirects the communication received from the mobile communication device to the particular server resource that stores a message (such as notification of an authorization failure) for the user. The gateway resource receives the message including the notification information and forwards it through the wireless access point over the wireless communication link to the mobile communication device.

In accordance with another example embodiment, as an alternative to redirecting a request for content to a specified server resource to distribute a corresponding message to the user of the mobile communication device, the gateway resource can be configured to access a resource such as a local repository and forward an appropriate message from the repository to the mobile communication device subsequent to the mobile communication device establishing the wireless communication link with the wireless access point. Thus, in one embodiment, the gateway resource initiates transmission of the appropriate message through the wireless access point over the wireless communication link to the mobile communication device in response to a condition such as receiving a communication (such as a request for content using a URL) generated by the mobile communication device.

Note that generation of the control information and corresponding notification information may not depend upon detection of an authorization error. For example, based on an identity of the corresponding user of the mobile communication device requesting access to the network, the remote server or other suitable resource can be configured to generate any type of suitable one or more messages for the user. In this manner, the user of the mobile communication device can be notified of any type of messaging.

Embodiments herein are useful over conventional techniques. For example, generation of flow control information and corresponding notification information enables a respective service provider to target appropriate messages to each of one or more different subscribers accessing a network through a respective wireless access point.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: initiate verification of a mobile communication device to establish a secured wireless link between the mobile communication device and a network access point; based on an outcome of the verification, produce control information; and forward the control information to a gateway resource that controls a flow of communications between the network access point and a network, the gateway resource facilitating transmission of a message to the mobile communication device in accordance with the control information.

Another embodiment as described herein includes computer readable storage medium, system, hardware, etc., having instructions stored thereon. The instructions, when executed by computer processor hardware, cause the computer processor hardware of the system to: receive control information, the control information generated based on verification of a mobile communication device attempting to access establish a wireless connection with an access point providing access to a network; subsequent to receiving the control information, receive a communication transmitted from the mobile communication device; and in response to receiving the communication, and as specified by the control information, initiating transmission of a message to the mobile communication device.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for implementing a message-processing resource to selectively provide network access to multiple networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
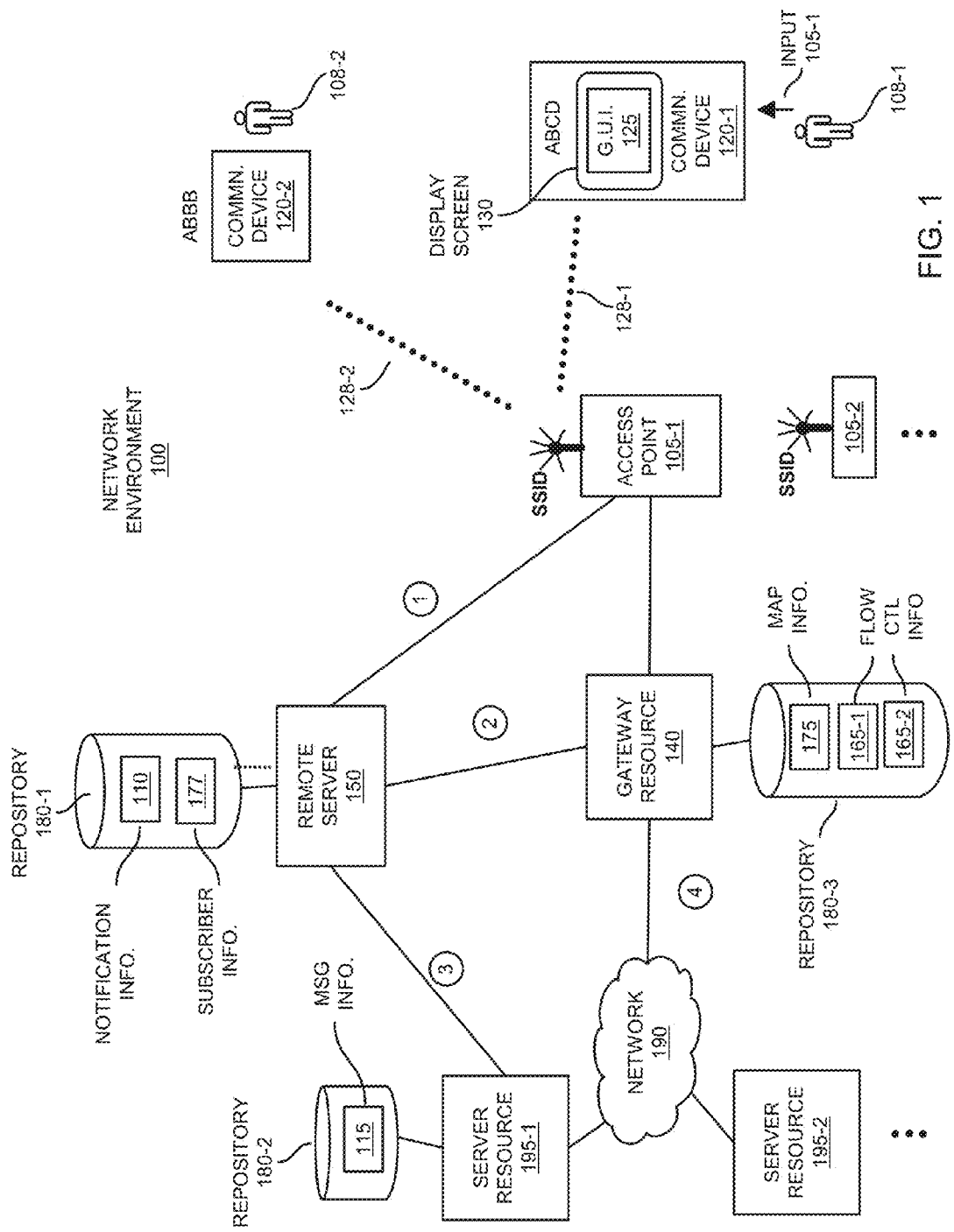
FIG. 1 is an example diagram illustrating a network environment facilitating delivery of notifications according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a network environment includes a wireless access point providing access to a corresponding network such as the Internet. The server resource (such as a AAA server) initiates verification of a mobile communication device attempting to establish a secured wireless link between the mobile communication device and a network access point. Based on an outcome of the verification (such as detecting an authorization error), the server resource produces control information. The server resource forwards the control information to a gateway resource. The gateway resource uses the control information to control a flow of subsequent communications between the network access point and a network such as the Internet. As further discussed herein, the gateway resource facilitates transmission of one or more messages to the mobile communication device in accordance with the control information.

In one embodiment, the server resource generates the one or more messages targeted to the user during authorization of the mobile communication device. Via forwarding of the messages, the user of the mobile communication device can be apprised of any type of information such as one or more authorization errors that occur during an attempt by the corresponding mobile communication device to create the wireless communication link with the wireless access point.

Now, more specifically, FIG. 1 is an example diagram illustrating a network environment and corresponding resources supporting data traffic flow control according to embodiments herein. Note that each of the resources such as the remote server 150, gateway resource 140, access point 105-1, access point 105-2, server resource 195-1, server resource 195-2, communication device 120-1, etc., represents or includes appropriate hardware, software, or a combination of hardware and software to carry out functionality as discussed herein.

As shown, network environment 100 includes mobile communication device 120-1, mobile communication device 120-2, etc. In this example embodiment, user 108-1 operates communication device 120-1; user 108-2 operates communication device 120-2; etc. As further discussed below, the users 108 operate respective communication devices 120 and communicate through access point 105-1 and gateway resource 140 to access network 190 such as the Internet.

In accordance with further embodiments, note that network 190 can be or include any suitable type of wired or wireless network resources facilitating communications. In one embodiment, network supports client/server communications and delivery of data packets using network addresses assigned to each of the resources.

In one embodiment, network 190 includes a packet-switched network facilitating distribution of communications (such as one or more data packets) in accordance with any suitable communication protocol. As a specific example embodiment, network 190 and corresponding resources therein support client/server communications and switching of data packets using source and destination address information. For example, the source address of a communication such as a data packet indicates a corresponding resource from which the data packet is generated. A destination address of a communication (data packet) indicates a corresponding address of the resource to which the data packet is being transmitted. The resources in network 190 use the destination address to route the respective data packets to an identified destination. The recipient (destination) of the communication uses the source address (associated with a respective communication device) to identify a particular client that transmitted the communication.

As further discussed herein, initially, each of the mobile communication devices 120 communicates through access point 105-1 to remote server 150 (such as a AAA server resource supporting functions such as authentication, authorization, accounting, etc.). Subsequent to authorization and establishing a respective wireless communication link such as medication link 128-1 over which to communicate with access point 105-1, the access point 105-1 forwards communications from respective communication devices 120 through gateway resource to network 190. In a reverse direction, gateway resource 140 conveys communications from network 190 to access point 105-1. Access point 105-1 further distributes the communications received from the gateway resource 140 to the appropriate communication device.

Each mobile communication device in network environment 100 is equipped to communicate in a wireless manner with an available access point. In one non-limiting example embodiment, each of one or more wireless access points 105 (such as access point 105-1, access point 105-2, etc.) and corresponding mobile communication devices 120 in network environment 100 supports communications over a respective wireless communication links 128 via any suitable protocol. By way of non-limiting example embodiment, a mobile communication device in a respective wireless access point can communicate in accordance with WiFi™ standards such as IEEE (Institute of Electrical and Electronics Engineers) 802.11a, 802.11b, 802.11g, 802.11n, etc.

As previously discussed, the gateway resource 140 controls access to network 190. The wireless access point 105-1 is communicatively coupled (such as via a hardwired or wireless communication link) to gateway resource 140. In an upstream direction, such as in a direction outbound from the communication device 120-1, when network access is granted to the mobile communication device 120-1, wireless access point 105-1 facilitates forwarding of communications from communication device 120-1 upstream through access point 105-1 to gateway resource 140. Thereafter, gateway resource 140 controls forwarding of the respective communications to network 190.

Conversely, in a downstream direction, inbound to the communication device 120-1, the gateway resource 140 facilitates distribution of communications received from resources in network 190 downstream to wireless access point 105-1. Wireless access point 105-1 further transmits the received communications to the appropriate communication device (such as communication device 120-1) to which the communications are addressed.

Figure 2:
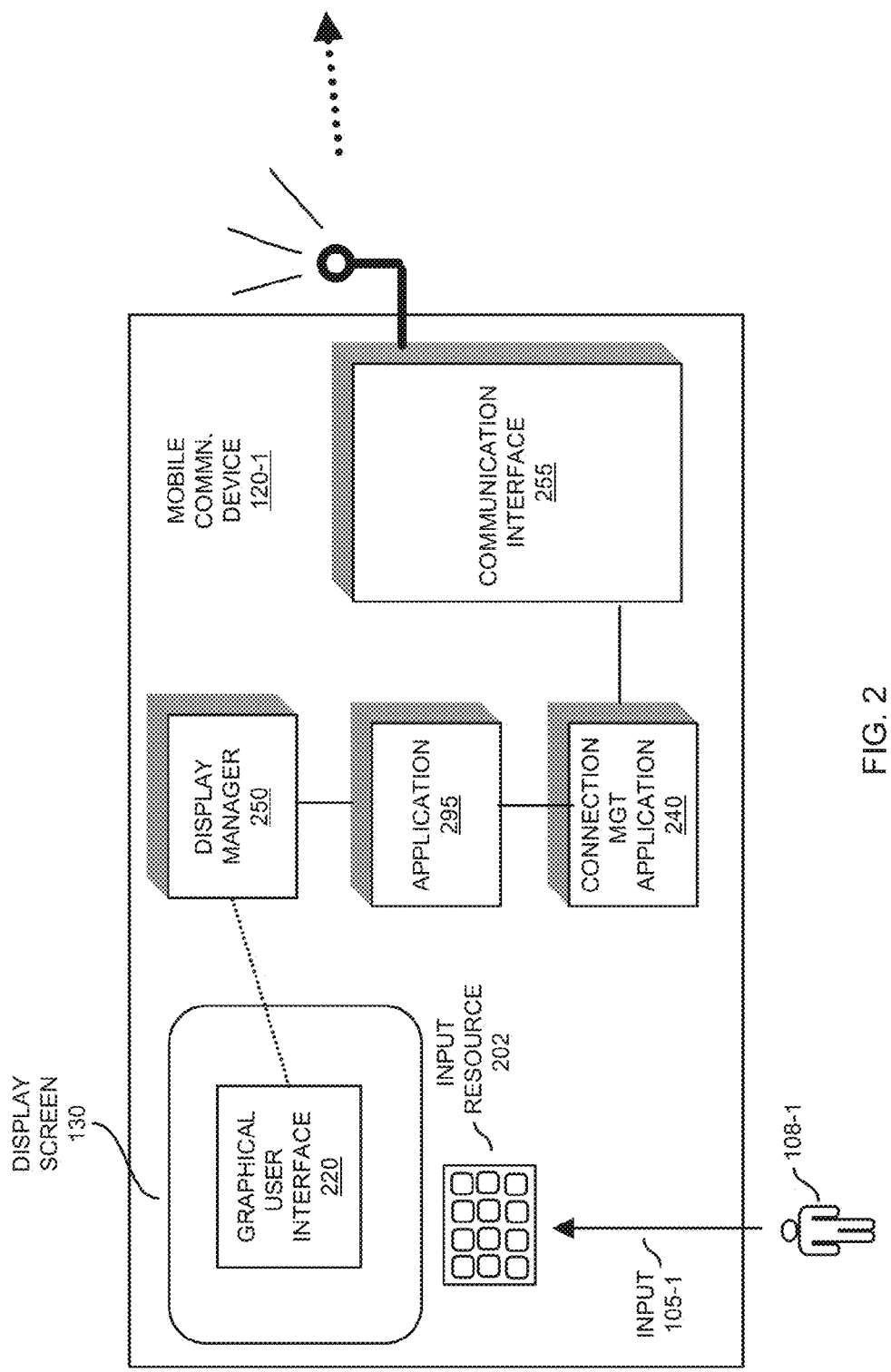
FIG. 2 is an example diagram illustrating a mobile communication device according to embodiments herein.

FIG. 2 is an example block diagram illustrating functionality associated with a respective mobile communication device according to embodiments herein. Note that each of the mobile communication devices 120 can include any suitable hardware and software resources to carry out operations as discussed herein.

Each of the mobile communication devices 120 in network environment 100 can be any suitable type of computer device. For example, a respective mobile communication device can be a cell phone, mobile computer, mobile phone device, digital assistant, a laptop computer, a personal computer, a notebook computer, a netbook computer, a handheld computer, a workstation, etc.

As further shown in this example embodiment, mobile communication device 120-1 includes display screen 130, connection management application 240, display manager 250, application 295 (such as a browser application), communication interface 255, etc. Each mobile communication devices in network environment 100 can operate in a similar manner and include similar resources, interfaces, applications, etc., as mobile communication device 120-1 as shown in FIG. 2.

Via input 105-1 to input resource 202 (such as a keyboard, touchscreen, mouse, etc.), assume that the user 108-1 initiates execution of application 295 such as a browser application. In one embodiment, subsequent to execution, the application 295 communicates with connection management application 240 to establish a respective wireless connection with a corresponding access point in network environment 100.

In response to receiving a command from application 295 to establish a network connection, the connection management application 240 (via communication interface 255) attempts to establish a respective wireless communication link with an available wireless access point in network environment 100. In this example embodiment, assume that the mobile communication device 120-1 attempts to establish respective wireless communication link 128-1 with access point 105-1. As previously discussed, this can include generating and transmitting a corresponding discovery request (such as from communication interface 255) to any listening access points 105 in network environment 100. The connection management application 240 selects amongst the responding one or more access points to establish a corresponding wireless communication link 120-1.

In one embodiment, whether to allow establishment of a respective wireless communication link may depend on authentication and authorization of the respective mobile communication device by remote server 150.

As previously discussed, subsequent to establishing a respective wireless communication link, the application 295 is able to communicate through a respective access point and access network 190. As further shown in this example embodiment, via display manager 250 in mobile communication device 120-1, the application 295 initiates display of corresponding graphical user interface 220 (such as a browser interface) on display screen 130 of mobile communication device 120-1. Graphical user interface 220 on display screen 130 enables the respective user 108-1 to view information retrieved from any of one or more server resources in network environment 100.

Referring again to FIG. 1, in one embodiment, the wireless access point 105-1 provides notification (such as via broadcast of an SSID or Service Set IDentifier assigned to the respective access point) of availability of the wireless access point 105-1 and corresponding availability of network access to the multiple mobile communication devices 120.

For example, in one embodiment, the wireless access point 105-1 (and corresponding message processing hardware therein) initiates transmission of a notification message (such as an SSID) from the wireless access point 105-1 to the mobile communication devices in network environment 100 indicating availability of the wireless access point 105-1 to the multiple mobile communication devices 120. In one embodiment, the notification (such as an SSID) is a human-readable string of bytes representing a corresponding unique network name assigned to the access point 105-1.

In certain instances, a respective SSID indicates a respective service provider that manages the corresponding wireless access point. Assuming that a user is a subscriber of services provided by the respective service provider, the user 108-1 may desire to connect to a specific wireless access point provided by the respective service provider.

In this example embodiment, after learning of the availability of wireless access point 105-1, assume that the user 108-1 operating communication device 120-1 would like to connect to wireless access point 105-1 to use services provided by the service provider. In such an instance, the communication device 120-1 sends a message over wireless communication link 128-1 to wireless access point 105-1 to connect to a respective network 190.

In one embodiment, each of the mobile communication devices must be authenticated before the respective mobile communication device is provided access to network 190 through a wireless access point and gateway resource 140. Authentication can include conveying communications between a respective mobile communication device 120 and a remote server 150 (through access point 105-1) to authenticate the respective mobile communication device 120-1.

In a non-limiting example embodiment, the message processing resources (such as one or more of wireless access point 105-1, server resource 150, gateway resource 140, etc.) can be configured to initiate authentication of the mobile communication devices in accordance with EAP (Extensible Authentication Protocol) or other suitable secured wireless protocol. In such an instance, subsequent to authentication, a respective wireless communication link supports secured communications.

Assume in this example embodiment that the remote server 150 is a so-called AAA server resource supporting services such as authentication, authorization, and accounting. The authentication functions associated with remote server 150 refers to the process in which an entity's identity is authenticated, typically by providing evidence that it holds a specific digital identity of the mobile communication device and the corresponding credentials such as passwords, one-time tokens, digital certificates, digital signatures, etc. The authorization function associated with the remote server 150 determines whether a particular entity is authorized to perform a given activity, typically inherited from authentication when logging on to an application or service. The accounting function associated with the remote server 150 refers to the tracking of network resource consumption by users for the purpose of capacity and trend analysis, cost allocation, billing, etc.

In a more specific embodiment, during authentication such as when the access point 105-1 initially communicates through wireless access point 105-1 to remote server 150, the wireless access point 105-1 receives and forwards an identity of the mobile communication device 120-1 (as provided by the software executing on the communication device 120-1) to the remote server and 150. In response to receiving the identity of the mobile communication device 120-1 and/or user 108-1, the remote server 150 communicates a challenge message in a reverse direction through wireless access point 105-1 back to the mobile communication device 120-1. In response to receiving the challenge message generated by the remote server 150, mobile communication device 120-1 produces a challenge response including appropriate credentials indicating that the communication device 120-1 and/or user 108-1 is authorized to use network 190. The mobile communication device 120-1 transmits the challenge response through access point 105-1 to remote server 150. The remote server 150 then verifies credentials received from communication device 120-1 using subscriber information 177 further shown in FIG. 3.

Figure 3:
FIG. 3 is an example diagram illustrating subscriber information according to embodiments herein.

FIG. 3 is an example diagram illustrating subscriber information according to embodiments herein. As shown, subscriber information 177 includes information about each of the different users (subscribers) and/or corresponding mobile communication devices that are authorized to use any of wireless access points 105 in network environment 100.

In this example embodiment, according to subscriber information 177: user 108-1 (such as a first subscriber) is assigned account #15523456-12, user 108-1 is assigned credentials 330-1, notification information 110-1 is associated with user 108-1, and user 108-1 operates mobile communication device 120-1 (which is assigned network address ABCD). Subscriber information 177 indicates that: user 108-2 is assigned account #15522677-17, user 108-2 is assigned credentials 330-2, notification information 110-2 is associated with user 108-2, user 108-2 operates mobile communication device 120-2 (which is assigned network address ABBB). Subscriber information 177 indicates that: user 108-3 is assigned account #15443456-12, user 108-3 is assigned credentials 330-3, notification information 110-3 is associated with user 108-3, and user 108-3 operates mobile communication device 120-3; and so on.

Referring again to FIG. 1, recall that promote server 150 authenticates the user 108-1 and corresponding mobile communication device 120-1. During authentication, assume that the mobile communication device 120-1 produces a challenge response including credentials associated with the (subscriber) user 108-1. In this instance, the remote server 150 compares the received credentials from communication device 120-1 to stored credentials 330-1. Assume that the received credentials match credentials 330-1 and that the corresponding mobile communication device 120-1 and corresponding user 108-1 are authenticated. The remote server 150 provides notification to the access point 105-1 indicating that the communication device 120-1 has been properly authenticated.

In addition to authenticating the mobile communication device 120-1 based on the forwarded information (such as identity information, credentials, etc.), the remote server 150 can be configured to initiate verification (such as authorization) of the mobile communication device 120-1 and/or corresponding user so that the mobile communication device 120-1 can establish and/or use a wireless link between the mobile communication device 120-1 and the network access point 105-1 to access the network 190. Verification of the mobile communication device 120-1 can include detecting whether the mobile communication device 120-1 is authorized to access the network 190.

During verification, assume that the remote server 150 determines that notification information 110-1 is available and queued for distribution to mobile communication device 120-1. For example, during the verification process, the remote server 150 can be configured to detect an identity of a user 108-1 operating the mobile communication device 120-1. The remote server 150 uses the information such as the detected identity of the user 108-1 and/or mobile communication device 120-1 as a basis to define what information is to be included in a message subsequently delivered to the user 108-1 operating the mobile communication device 120-1.

More specifically, assume that the remote server 150 detects an authorization error during verification of the mobile communication device 120-1 and/or user 108-1. The detected authorization error can be of any type such as: i) that the user 108-1 of the mobile communication device 120-1 has used more than a predetermined number of granted simultaneous WiFi™ sessions, ii) that the user 108-1 of the mobile communication device 120-1 has a suspended account because the user of the mobile communication device 120-1 has an outstanding unpaid subscription bill due, iii) that the user 108-1 subscribes to only a low tier high speed data service that does not allow WiFi™ access through wireless access point 105-1, iv) that the user 108-1 has exceeded an amount of data retrieval or has exceeded an amount of allocated access time as specified by a WiFi usage plan, etc.

In accordance with conventional systems, any of these authorization errors would normally prevent a respective user from accessing a network using a respective wireless access point. In one embodiment, rather than prevent the mobile communication device access 120-1 with the network 190, certain embodiments herein include providing the respective user 108-1 and/or corresponding mobile communication device 120-1 at least temporary authorization to use a wireless network and/or access the network 190 such as the Internet via communications conveyed through the gateway resource 140 even though there is an authorization failure. Thus, despite detection of an authorization error, the remote server 150 can be configured to at least temporarily authorize and allow the mobile communication device 120-1 to access the network 190 via communications through the gateway resource 140.

After temporary usage of the wireless communication link 128-1, the gateway resource 140 or other suitable resource can be configured to terminate connectivity (such as wireless communication link 128-1) of the mobile communication device 120-1 with the wireless access point 105-1.

Providing temporary authorization can include providing notification (from remote server resource 150) to any of one or more resources (such as gateway resource 140, access point 105-1, communication device 120-1, etc.) that the corresponding mobile communication device 120-1 has been authorized to establish wireless communication link 128-1 and access network 190.

Assume in this example that the remote server 150 performing verification of the user 108-1 and/or corresponding mobile communication device 120-1 detects one or more authorization errors. In one embodiment, in response to detecting the one or more authorization errors (or that other types of messages are available for the corresponding user 108-1), the remote server 150 initiates generation of notification information 110 indicating the detected one or more authorization errors and/or available messages. The remote server 150 (or other suitable resource generating the notification information) can be configured to incorporate the notification information 110 in a retrievable document, file, etc., such as a webpage that is intended for delivery to the corresponding user 108-1 of mobile communication device 120-1.

Figure 4:
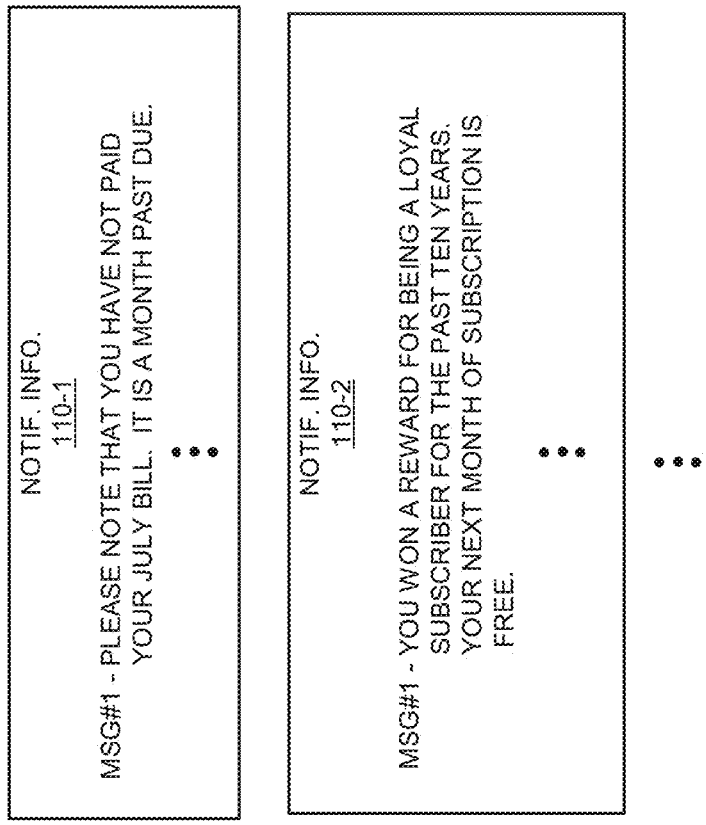
FIG. 4 is an example diagram illustrating notification information in which to provide notification to one or more users according to embodiments herein.

FIG. 4 is an example diagram illustrating generation of notification information according to embodiments herein. As shown, in this example embodiment, the remote server 150 generates the notification information 110-1 to indicate an event such as that a subscription bill is past due; remote server 150 generates notification information 110-2 indicating an event such as that a corresponding subscriber one a reward for being a loyal subscriber for the past 10 years and that a next month of subscription is free; and so on. In this manner, the remote server 150 can generate any of multiple different types of messages that are to be subsequently delivered to the communication device requesting access to network through access point 105-1.

Figure 5:
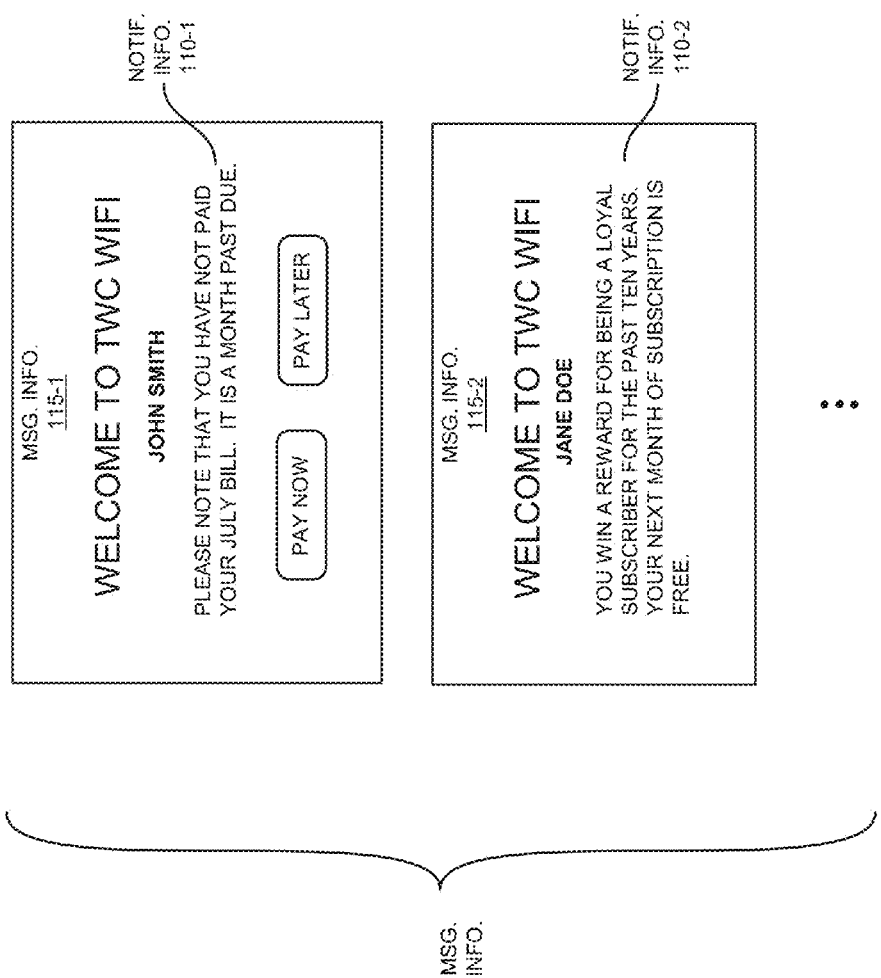
FIG. 5 is an example diagram illustrating different messages (including notification information) for delivery to corresponding subscribers according to embodiments herein.

Referring again to FIG. 1, the remote server 150 forwards or makes the notification information 110 available to server resource 195-1 in network environment 100. Server resource 195-1 utilizes the notification information 110 to produce message information 115 (such as message information 115-1 including notification information 110-1, message information 115-2 including notification information 110-2, etc.) as shown in FIG. 5.

As further shown in FIG. 1, server resource 195-1 stores message information 115 in repository 180-2. As further discussed below, the message information 115 is available for subsequent distribution to mobile communication devices having access to network 190.

Based on an outcome of the verification (such as an authorization check performed by remote server 150 or other suitable resource) of the mobile communication device 120-1 and/or corresponding user 108-1, the remote server 150 produces flow control information 165-1 and forwards it to gateway resource 140. Gateway resource 140 stores corresponding flow control information 165 (such as flow control information 165-1) in repository 180-3.

Figure 6:
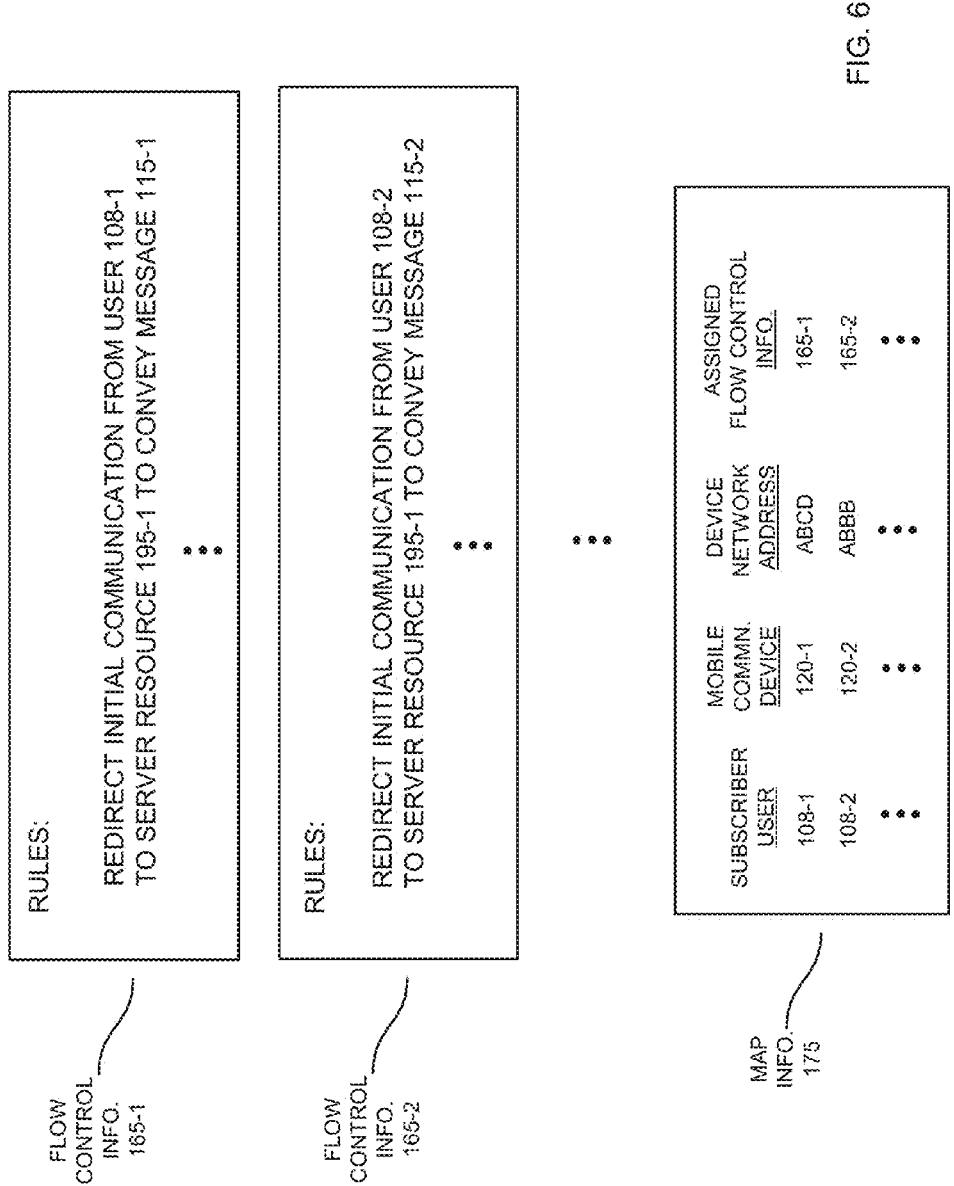
FIG. 6 is an example diagram illustrating mapping information and flow control information according to embodiments herein.

In addition to storing flow control information 165 for one or more communication devices 120 in repository 180, the gateway resource 140 maintains map information 175 and stores it in repository 180-3. Gateway resource 140 (or other suitable resource) produces the map information 175 (a shown in FIG. 6) to indicate: i) that the flow control information 165-1 is assigned to user 108-1 operating mobile communication device 120-1 having a network address of ABCD; ii) that the flow control information 165-2 is assigned to user 108-2 operating mobile communication device 120-2 having a network address of ABBB; and so on.

As a more specific example of controlling a flow of communications, assume that the remote server 150 produces the flow control information 165-1 in response to detecting a condition such as occurrence of an authorization error associated with providing the mobile communication device 120-1 network access through the gateway resource 140. The flow control information 165-1 specifies a particular server resource such as server resource 195-1 in the network 190 in which to redirect an initial communication from the mobile communication device 120-1.

The remote server forwards the flow control information 165-1 to gateway resource (such as a WiFi™ session controller gateway). The gateway resource 140 utilizes the flow control information 140 to control a flow of communications between the network access point 105-1 and the network 190. In accordance with the flow control information 165-1 received from the remote server 150, the gateway resource 140 facilitates distribution of message information 115 (including notification information 110) to one or more communication devices 120 present in network environment 100.

As a further example illustrating a forwarding of communications, subsequent to receiving an acknowledgment of authorization and authentication from the remote server 150, assume that the user 108-1 operating mobile communication device 120-1 operates a browser application and requests to retrieve a webpage from server resource 195-2 in network 190 using a URL (Uniform Resource Locator) such as Google.com. In such an instance, the mobile communication device 120-1 transmits the communication (to retrieve the Google™ webpage) over wireless communication link 128-1 to wireless access point 105-1. The wireless access point 105-1 forwards the communication (request for webpage) to gateway resource 140. Accordingly, the gateway resource 140 receives the communication (webpage request) transmitted from the mobile communication device 120-1 to retrieve data from the network.

Under normal circumstances, the gateway resource 140 would transmit the request for webpage to the respective target destinations such as server resource 195-2. However, in this example, recall that an authorization error occurred while the corresponding mobile communication device 120-1 attempted to establish the wireless communication link 128-1. The gateway resource 140 utilizes map information 175 to determine that the mobile communication device 120-1 and corresponding user 108-1 are assigned flow control information 165-1. In accordance with the flow control information 165-1, the gateway resource 140 redirects the request from mobile communication device 120-1 to server resource 195-1 to retrieve message 115-1 associated with user 108-1. In response to receiving the request, server resource 195-1 transmits message 115-1 over network 190 to gateway resource 140. Gateway resource 140 transmits the message information 115-1 through wireless access point 105-1 over wireless communication link 128-1 to mobile communication device 120-1. Accordingly, instead of receiving a requested webpage (such as the Google webpage), the communication device 120-1 receives message 115-1 indicating occurrence of the authorization error.

Figure 7:
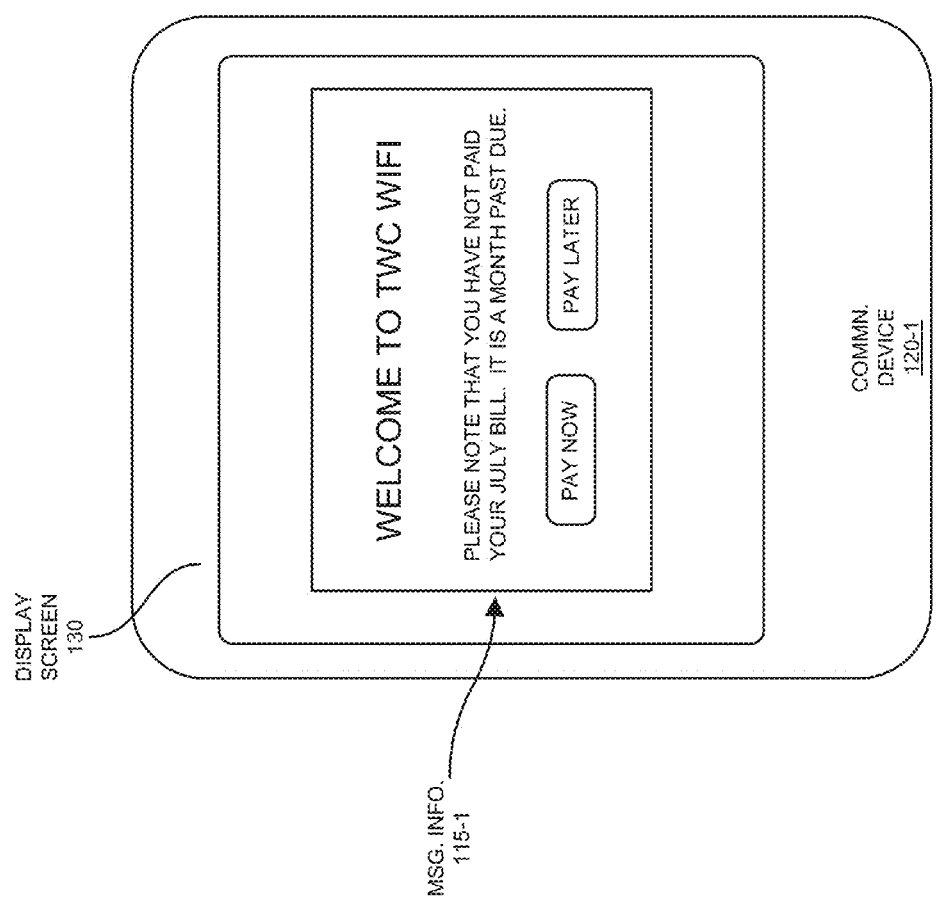
FIG. 7 is an example diagram illustrating display of a respective message on a mobile communication device to a user according to embodiments herein.

As shown in FIG. 7, mobile communication device 120-1 initiates display of corresponding message information 115-1 on display screen 130 for viewing by respective user 108-1 (John Smith). In addition to providing notification 110-1, message information 115-1 can be configured to include one or more selectable display regions (such as buttons, symbols, etc.) to perform additional actions associated with the notification message. For example, message information 115-1 can include a PAY NOW symbol to indicate that the corresponding user 108-1 can select the PAY NOW display region and pay the corresponding bill right now. In one embodiment, selection of the PAY NOW symbol would cause the mobile communication device 120-1 to be further redirected to a corresponding webpage enabling the user 108-1 to pay their bill immediately.

If desired, note that further use of the corresponding wireless communication link 128-1 may be contingent upon the corresponding user 108-1 paying their outstanding bill. For example, if the user selects the PAY LATER displayed in message information 110-1, the gateway resource 140 can be configured to immediately terminate or provide limited further access to network 190.

Accordingly, embodiments herein can include providing notification of authorization errors that are not otherwise available for viewing by respective user. In other words, if a respective user of a mobile communication device was not granted access to network 190 through gateway resource 140 and access point 105-1 because there was an authorization failure, the corresponding user 108-1 would not be notified via message 115-1 that there is an outstanding subscription fee due to a corresponding service provider providing access point 105-1.

Note that use of redirects is shown by way of non-limiting example only. That is, the gateway resource 140 can initiate transmission of a corresponding message to the mobile communication devices in any suitable manner. For example, in accordance with yet further embodiments, as an alternative to redirecting a request message to a different server resource than originally intended by the sender, the gateway resource 140 can be configured to receive and store message information 115 received from remote server 150. In this latter instance, the gateway resource 140 stores the message information in repository 180-3 and forwards it to the corresponding mobile communication device 120-1 through access point 105-1 to notify the corresponding user 108-1 of any available messages earmarked for the corresponding user 108-1.

In a similar manner, note that gateway resource 140 controls flow of data to user 108-2 (Jane Doe) operating communication device 120-2. For example, in accordance with flow control information 165-2, gateway resource 140 redirects message information 115-2 for display on the corresponding communication device 120-2. Via display of message information 115-2 on corresponding display screen of communication device 120-2, the user 108-2 learns that they win an award for being a loyal subscriber for the past 10 years.

Embodiments herein are useful over conventional techniques. For example, generation of flow control information and corresponding notification information enables a respective service provider to target appropriate messages to each of one or more different subscribers accessing a network to a respective wireless access point.

Another Specific Example of EAP Authentication

1. During a WiFi EAP (802.1x) authentication, the back end AAA system such as remote server 150 that provides authorization identifies any authorization errors for the user 108-1, and keeps the error in the session state for the authenticated session and returns EAP Success with a guest access timeout that is usually much shorter than fully granted sessions. This means that the user 108-1 has limited access if there is an authorization error during authorization.

2. On the subsequent data path through gateway resource 140, the WiFi session control gateway denies a full access after looking up the AAA system for the authorization state and discovered the session should not be granted for full access.

3. As previously discussed, the denial in step 2 can result in a redirection of the data session to a captive web portal such as provided by server resource 195-1.

4. The captive web portal can obtain the authorization error message that was stored in the AAA system via a session query, or the error message can be embedded in the redirection URL in step 3 as a parameter, depending on what is supported on the WiFi session gateway.

5. The captive web portal such as server resource 195-1 displays the error to the end device via the redirected data session, in a consistent look and feel that is branded by the service provider (in other words, the display message can display messages from the service provider company TWC). On the displayed web page displaying one or more messages, an additional hyper link or script can be run to provide instructions and methods for the user to rectify the error, e.g. paying the bill.

Figure 8:
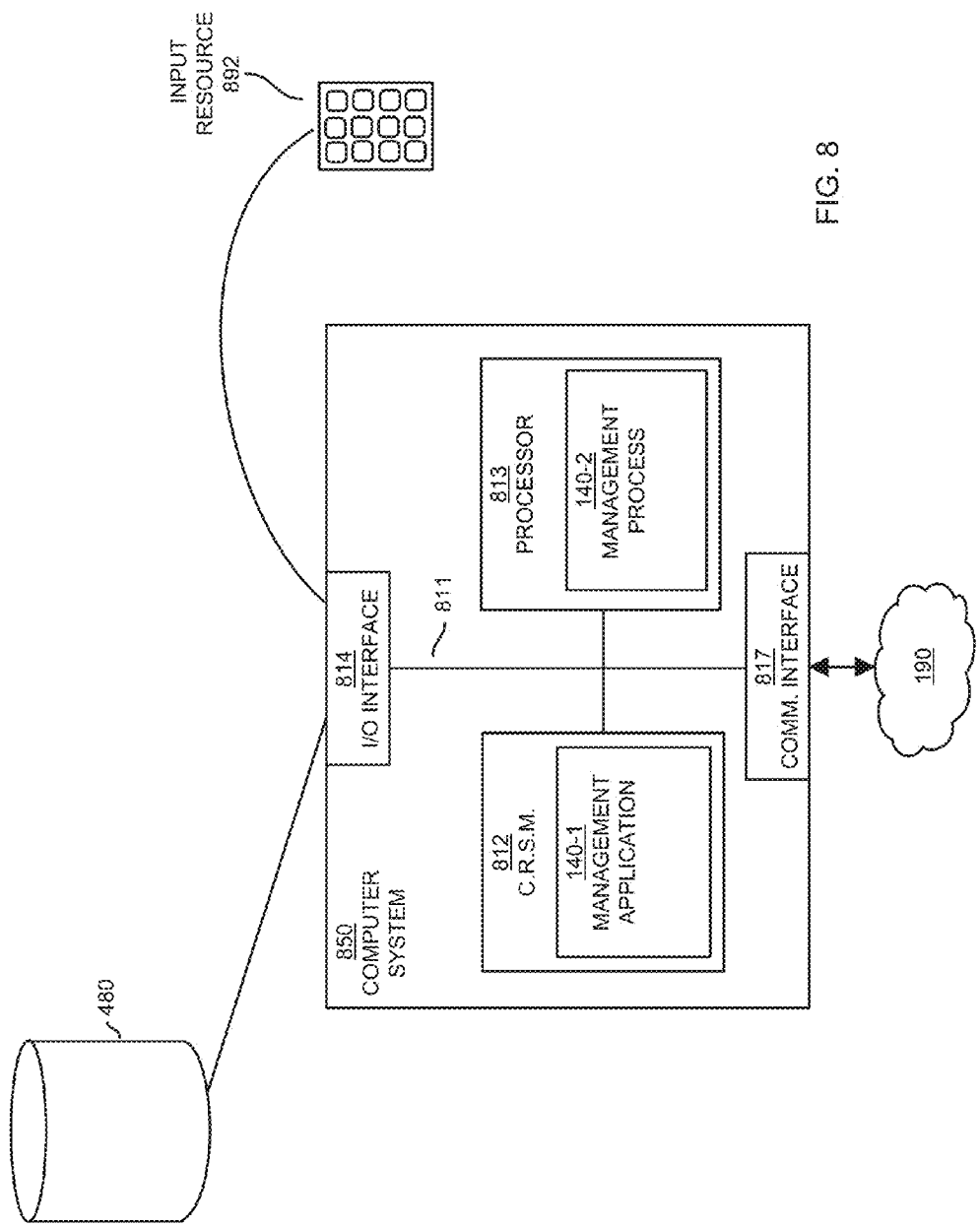
FIG. 8 is an example diagram illustrating a computer system to carry out operations according to embodiments herein.

FIG. 8 is a diagram illustrating an example computer architecture in which to execute any of the functionality according to embodiments herein. Any of the different processing techniques can be implemented via execution of software code on computer processor hardware.

For example, as shown, computer system 850 (e.g., computer processor hardware) of the present example can include an interconnect 811 that couples computer readable storage media 812 such as a non-transitory type of media (i.e., any type of hardware storage medium) in which digital information can be stored and retrieved. The computer system 850 can further include processor 813 (i.e., computer processor hardware such as one or more processor co-located or disparately located processor devices), I/O interface 814, communications interface 817, etc.

Computer system 850 can be located at any suitable locations in network environment 100 to carry out the operations as discussed herein. For example, computer processor hardware (i.e., processor 813 and/or computer system 850) and/or management application 140-1 can be located in a single location or can be distributed amongst multiple locations. Management application 140-1 can be configured to execute the operations as discussed with respect to remote server 150, gateway resource 140, server resource 195-1, mobile communication device 120-1, etc.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with management application 140-1.

Communications interface 817 enables the computer system 850 and processor resource 813 to communicate over a resource such as any of networks 890. I/O interface 814 enables processor resource 813 to access data from a local or remote location, control a respective display screen, receive input, etc.

As shown, computer readable storage media 812 can be encoded with management application 140-1 (e.g., software, firmware, etc.) executed by processor 813. Management application 140-1 can be configured to include instructions to implement any of the operations as discussed herein associated with the gateway resource 140, remote server 150, mobile communication devices 120, wireless access points 105, etc.

During operation of one embodiment, processor 813 accesses computer readable storage media 812 via the use of interconnect 811 in order to launch, run, execute, interpret or otherwise perform the instructions in management application 140-1 stored on computer readable storage medium 812.

Execution of the management application 140-1 produces processing functionality such as management process 140-2 in processor resource 813. In other words, the management process 140-2 associated with processor resource 813 represents one or more aspects of executing management application 140-1 within or upon the processor resource 813 in the computer system 850.

Those skilled in the art will understand that the computer system 850 can include other processes and/or software and hardware components, such as an operating system that controls allocation and use of hardware resources to execute management application 140-1.

In accordance with different embodiments, note that computer system may be any of various types of devices, including, but not limited to, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement any of the functionality as discussed herein.

Note that each of the other functions as discussed herein can be executed in a respective computer system based on execution of corresponding instructions. For example, communication device can include respective computer readable storage medium and processor hardware to execute the operations performed by communication device 110-1.

Functionality supported by the different resources will now be discussed via flowcharts in FIGS. 9 and 10. Note that the steps in the flowcharts below can be executed in any suitable order.

Figure 9:
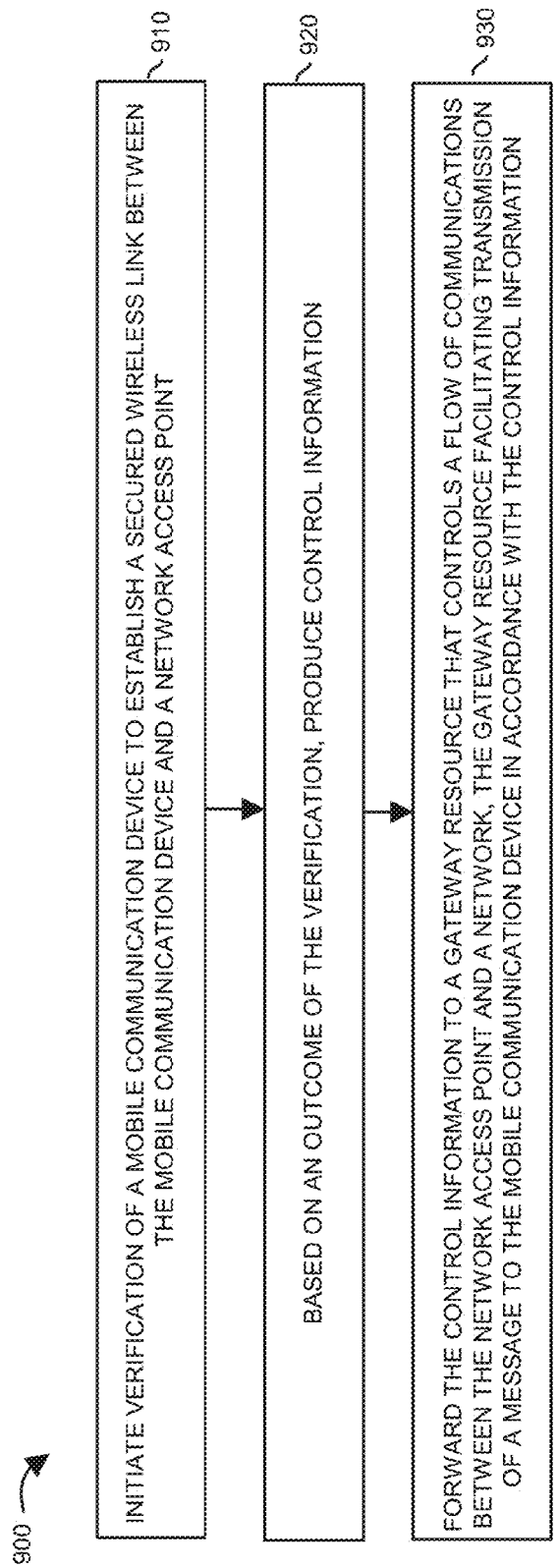
FIG. 9 is an example diagram illustrating a method according to embodiments herein.

FIG. 9 is a flowchart 900 illustrating an example method according to embodiments. Note that there will be some overlap with respect to concepts as discussed above.

In processing block 910, the manager 140 initiates verification of mobile communication device 120-1 to establish a secured wireless communication link 120-1 between the mobile communication device 120-1 and network access point 105-1.

In processing block 920, based on an outcome of the verification, the manager 140 produces flow control information 165-1.

In processing block 930, the manager 140 forwards the flow control information 165-1 to a gateway resource 140. Gateway resource 140 controls a flow of communications between the network access point 105-1 in network 190. During operation, the gateway resource 140 facilitates transmission of one or more messages to the mobile communication device 120-1 in accordance with the flow control information 165-1.

Figure 10:
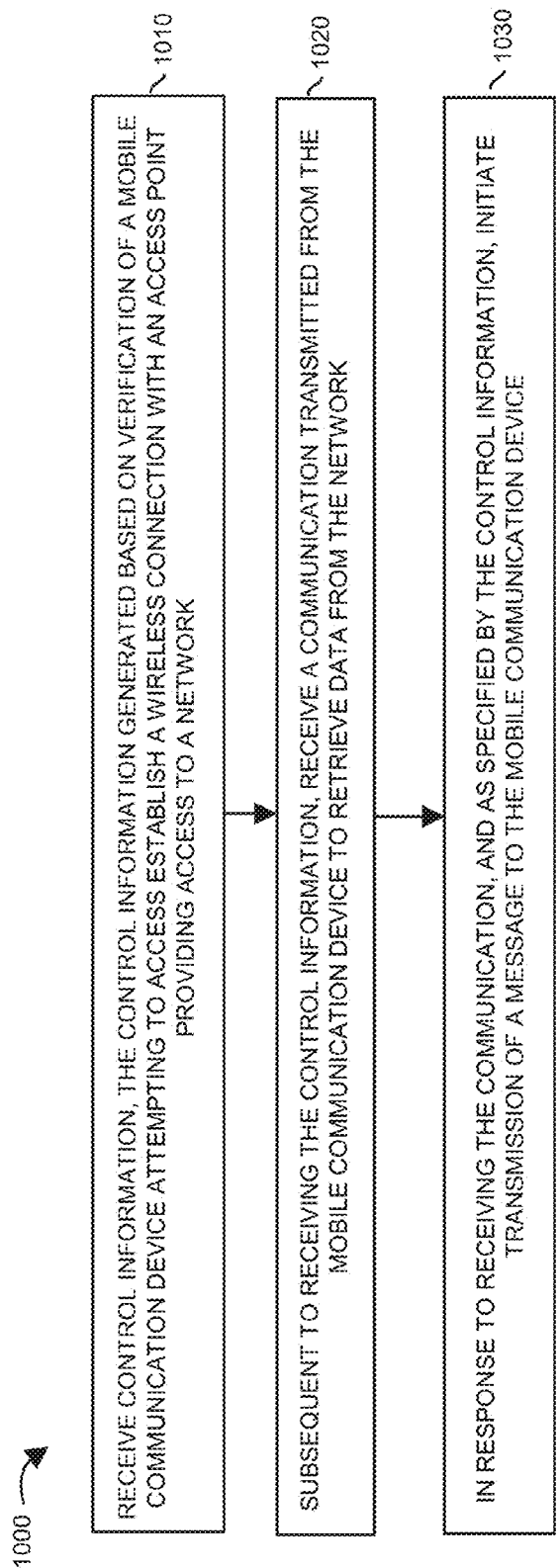
FIG. 10 is an example diagram illustrating a method according to embodiments herein.

FIG. 10 is a flowchart 1000 illustrating an example method according to embodiments. Note that there will be some overlap with respect to concepts as discussed above.

In processing block 1010, the gateway resource 140 receives flow control information 165. As previously discussed, the manager 140 produces the flow control information 165-1 based on verification of mobile communication device 120-1 attempting to establish a wireless communication link 128-1 (connection) with an access point 105-1 providing access to network 190.

In processing block 1020, subsequent to receiving the flow control information 165-1, the gateway resource 140 receives a communication transmitted from the mobile communication 120-1.

In processing block 1030, in response to receiving the communication, and as specified by the flow control information 165-1, the gateway resource 140 initiates transmission of message information 115-1 to the mobile communication device 120-1.

Note again that techniques herein are well suited for generation and distribution of flow control information and/or notification information (any types of messages). However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via message processing hardware, performing operations of:
   initiating verification of a mobile communication device to establish a secured wireless link between the mobile communication device and a network access point;
   based on an outcome of the verification in which the mobile communication device is detected as being authorized to establish the secured wireless link, producing control information; and
   forwarding the control information to a gateway resource that uses the control information to control a flow of communications between the network access point and a network, the gateway resource facilitating transmission of a message to the mobile communication device in accordance with the control information;
   the method further comprising:
   producing the control information to redirect a received data retrieval request from the mobile communication device to an alternative remote server instead of an original server resource as specified by the data retrieval request the control information configured to initiate performance of the redirect for delivery of the message to the mobile communication device.

2. The method as in claim 1 further comprising:
during verification, detecting an identity of a user operating the mobile communication device; and
utilizing the detected identity of the user as a basis to define what information is to be included in the message.

3. The method as in claim 2 further comprising:
producing the control information to indicate to initiate forwarding of the message through the network access point over the secured wireless link to the mobile communication device in response to the gateway resource receiving a communication transmitted from the mobile communication device over the secured wireless link through the network access point to the gateway resource.

4. The method as in claim 1, wherein initiating verification of the mobile communication device includes detecting that the mobile communication device is authorized to access the network through the gateway resource.

5. The method as in claim 1 further comprising:
producing the control information in response to detecting occurrence of an authorization error during the verification, the control information specifying the message to be forwarded to the mobile communication device.

6. The method as in claim 5 further comprising:
despite detection of the authorization error, at least temporarily authorizing the mobile communication device to access the network via communications through the gateway resource.

7. The method as in claim 1 further comprising:
producing the control information to provide notification of the message to the mobile communication device.

8. The method as in claim 7, wherein the message is a reminder, targeted for delivery to a subscriber operating the mobile communication device, to perform a duty for use of the gateway resource to access the network through the wireless access point and the gateway resource.

9. The method as in claim 1 further comprising:
at the gateway resource, initiating delivery of the message to the mobile communication device in a manner as specified by the control information.

10. The method as in claim 9, wherein initiating delivery of the message to the mobile communication device in accordance with the control information further comprises:
retrieving the message; and
forwarding the message from the gateway resource through the wireless access point to the mobile communication device.

11. The method as in claim 1 further comprising:
detecting availability of the message during the verification of the mobile communication device;
producing the control information for delivery of the message to a subscriber operating the mobile communication device; and
wherein the message is a reminder for the subscriber to perform a subscription duty with respect to use of the wireless access point to retrieve data from the network.

12. The method as in claim 1 further comprising:
detecting an identity of a subscriber associated with the mobile communication device during the verification;
utilizing the identity to identify the message, the message generated to provide a notification to the subscriber; and
producing the control information to deliver the message to the mobile communication device.

13. A method comprising
via message processing hardware, performing operations of:
receiving control information, the control information generated based on verification of a mobile communication device attempting to establish a wireless connection with an access point providing access to a network;

subsequent to receiving the control information, receiving a communication transmitted from the mobile communication device; and in response to receiving the communication, and as specified by the control information, initiating transmission of a message to the mobile communication device;

wherein the mobile communication device transmits the communication to retrieve data from the network; and wherein initiating transmission of the message to the mobile communication device further comprises: redirecting the communication to a different network address than as specified by an original destination address in the received communication.

14. The method as in claim 13, wherein redirecting the communication to a different network address than as specified by the original destination address includes:

retrieving a network address from the control information;

replacing the original destination address in the communication with the network address retrieved from the control information; and forwarding the communication over the network to a server resource assigned the network address retrieved from the control information.

15. The method as in claim 14 further comprising:

receiving a response from the server resource, the response including a message to a user of the mobile communication device; and forwarding the response through the access point and over the wireless connection to the mobile communication device.

16. A method comprising:

via message processing hardware, performing operations of:

receiving control information, the control information generated based on verification of a mobile communication device attempting to establish a wireless connection with an access point providing access to a network;

subsequent to receiving the control information, receiving a communication transmitted from the mobile communication device; and in response to receiving the communication, and as specified by the control information, initiating transmission of a message to the mobile communication device;

wherein the mobile communication device attempts to establish a secured wireless connection; and wherein the received control information is generated in response to detecting an authorization error during the verification of the mobile communication device and establishment of the secured wireless connection.

17. The method as in claim 16, wherein initiating transmission of the message further comprises:

processing the control information to identify the message to be transmitted to the mobile communication device; and initiating transmission of the identified message to the mobile communication device, the message indicating occurrence of the authorization error during verification.

18. A method comprising via message processing hardware, performing operations of:

receiving control information, the control information generated based on verification of a mobile communication device attempting to establish a wireless connection with an access point providing access to a network;

subsequent to receiving the control information, receiving a communication transmitted from the mobile communication device; and in response to receiving the communication, and as specified by the control information, initiating transmission of a message to the mobile communication device;

producing a map associating a network address of the mobile communication device with the received control information; and wherein initiating transmission of the message to the mobile communication device further comprises:

obtaining the network address of the mobile communication device from the communication;

mapping the network address of the mobile communication device obtained from the communication to the control information;

processing the control information to identify the message; and initiating transmission of the message to the mobile communication device.

19. A system comprising:

computer processor hardware; and a hardware storage resource coupled to communicate with the computer processor hardware, the hardware storage resource storing instructions that, when executed by the computer processor hardware, causes the computer processor hardware to perform operations of:

initiating verification of a mobile communication device to establish a secured wireless link between the mobile communication device and a network access point;

based on an outcome of the verification, producing control information; and forwarding the control information to a gateway resource that controls a flow of communications between the network access point and a network, the gateway resource facilitating transmission of a message to the mobile communication device in accordance with the control information;

wherein initiating verification of the mobile communication device includes detecting whether the mobile communication device is authorized to access the network;

wherein the computer processor hardware further performs operations of: producing the control information in response to detecting occurrence of an authorization error associated with providing the mobile communication device network access through server resource in the network in which to redirect a communication transmitted from the mobile communication device.

20. The computer system as in claim 19, wherein the computer processor hardware further performs operations of:

during verification, detecting an identity of a user operating the mobile communication device; and utilizing the detected identity of the user as a basis to define what information is to be included in the message.

21. The computer system as in claim 20, wherein the computer processor hardware further performs operations of:
producing the control information to indicate to initiate forwarding of the message through the network access point over the secured wireless link to the mobile communication device in response to the gateway resource receiving a communication transmitted from the mobile communication device over the secured wireless link through the network access point to the gateway resource.

22. The computer system as in claim 19, wherein the computer processor hardware further performs operations of:
despite detection of the authorization error, at least temporarily authorizing the mobile communication device to access the network via communications through the gateway resource.

23. The computer system as in claim 22, wherein the computer processor hardware further performs operations of:
in response to detecting the authorization error, producing notification information indicating the detected authorization error; and
forwarding the notification information to the particular server resource, the particular server resource communicating the notification information through the gateway resource to the mobile communication device.

24. The computer system as in claim 19, wherein the computer processor hardware further performs operations of:
producing the control information to indicate how to control forwarding of a subsequent communication received from the mobile communication device, the subsequent communication transmitted by the mobile communication device over the secured wireless link through the network access point.

25. A system comprising:
computer processor hardware: and
a hardware storage resource coupled to communicate with the computer processor hardware the hardware storage resource storing instructions that, when executed by the computer processor hardware, causes the computer processor hardware to perform operations of:
initiating verification of a mobile communication device to establish a secured wireless link between the mobile communication device and a network access point:
based on an outcome of the verification, producing control information; and
forwarding the control information to a gateway resource that controls a flow of communications between the network access point and a network, the gateway resource facilitating transmission of a message to the mobile communication device in accordance with the control information;
wherein the computer processor hardware further performs operations of: producing the control information in response to detecting occurrence of an authorization error during the verification, the control information specifying the message to be forwarded to the mobile communication device.

26. The computer system as in claim 25, wherein the computer processor hardware further performs operations of:
despite detection of the authorization error, at least temporarily authorizing the mobile communication device to access the network via communications through the gateway resource.

27. Computer-readable storage hardware having instructions stored thereon, the instructions, when carried out by computer processor hardware, causing the computer processor hardware to perform operations of:
initiating verification of a mobile communication device to establish a secured wireless link between the mobile communication device and a network access point;
based on an outcome of the verification, producing control information;
producing the control information to redirect a subsequent received data retrieval request from the mobile communication device to an alternative remote server instead of an original server resource as specified by the data retrieval request, the control information configured to perform the redirect for delivery of the message to the mobile communication device; and
forwarding the control information to a gateway resource that controls a flow of communications between the network access point and a network, the gateway resource facilitating transmission of a message to the mobile communication device in accordance with the control information.

* * * * *